United States Patent [19]
Schreiner et al.

[11] Patent Number: 5,325,656
[45] Date of Patent: Jul. 5, 1994

[54] COTTON HARVESTER WITH VARIABLE RATIO SPINDLE-TO-DRUM SPEED

[75] Inventors: Joel M. Schreiner, Ankeny; Donald K. Davenport, Woodburn, both of Iowa

[73] Assignee: Deere & Company, Moline, Ill.

[21] Appl. No.: 11,569

[22] Filed: Feb. 1, 1993

[51] Int. Cl.5 .................................... A01D 46/18
[52] U.S. Cl. .................... 56/10.2 H; 56/41; 56/DIG. 2
[58] Field of Search ............. 56/41, 10.2 H, 50, 28, 56/DIG. 2

[56] References Cited

U.S. PATENT DOCUMENTS

| | | |
|---|---|---|
| 3,439,788 | 4/1969 | Fergason . |
| 4,866,918 | 9/1989 | Engelstad et al. ............. 56/10.3 |
| 4,896,491 | 1/1990 | Warnsholz et al. ............. 56/28 |
| 5,099,635 | 3/1992 | Butkovich et al. ............. 56/28 X |
| 5,247,786 | 9/1993 | Schreiner ............. 56/41 |

*Primary Examiner*—Terry Lee Melius

[57] ABSTRACT

In one embodiment of the invention, a speed changing device located between the drum and spindle drives of a cotton picker row unit provides a variable ratio spindle-to-drum speed so that ground and spindle speed can be optimized to match field conditions. An automatic transmission with one or more shift points provides a plurality of gear ratio combinations to optimize spindle speed while ideal harvester ground speed for the prevailing crop conditions is maintained. Shift point selection provides downshifting when the spindle speed begins to exceed the desired maximum RPM and upshifting when the speed drops below a minimum RPM. Alternatively, a compact idler gear arrangement located between the drum and spindle drives on the row unit is shiftable to change the ratio of spindle speed to drum speed without affecting drum speed to ground speed synchronization. In another embodiment of the invention, variable ratio between the drum and spindle drives is provided by introducing an independent spindle drive train. The drum speed is synchronized to the forward speed of the harvester in the conventional manner, and the spindle drive maintains optimum spindle rotational speed independently of the drum speed changes. A further embodiment utilizes a constant speed unit drive to maintain spindle speed within the optimum range, and a gear change in the drum drive gears provides drum synchronization.

29 Claims, 8 Drawing Sheets

COTTON HARVESTER WITH VARIABLE RATIO SPINDLE-TO-DRUM SPEED

BACKGROUND OF THE INVENTION

Field of the Invention

The present invention relates generally to cotton harvesters, and more specifically, to a spindle and drum drive structure for the harvesting unit of a cotton picker.

Related Art

Spindle type of cotton harvesters such as the commercially available John Deere Model 9950 have picker drums, the speed of which are synchronized with ground speed for most effective spindle operation in the plant row. The spindles are rotated at a speed which is a direct ratio to the drum speed. Increased power demands and spindle wear with increased spindle speed have limited maximum spindle speed to slightly over 4000 RPM at maximum ground speed. Over the years, incremental increases in maximum harvesting speed have been made, but maximum spindle RPM has remained the same. As a result, within the time limit that the spindle is engaged in the row, the spindle makes fewer revolutions in the row for the faster harvesting speeds. Above approximately 3.5 MPH, the spindle does not pluck cotton bolls as effectively from the plant under certain conditions. Therefore, further increases in cotton harvester ground speed have been limited. Higher picker speeds that otherwise would be possible in certain field conditions cannot be achieved without a decrease in picking efficiency when more difficult crop conditions prevail.

The doffers that remove the cotton from the spindles rotate at a speed directly proportional to spindle speed. As a result, the doffer column achieves maximum doffing efficiency in a given range of ground speeds. Variation from that ground speed range adversely affects the doffer efficiency, especially during low speed operation when doffer speed is slowed correspondingly.

BRIEF SUMMARY OF THE INVENTION

It is therefore an object of the present invention to provide an improved cotton harvester spindle drive arrangement. It is a further object to provide such a drive arrangement which overcomes most or all of the problems discussed above.

It is another object of the present invention to provide improved cotton harvester spindle drive apparatus and method which permit higher ground speeds, where field conditions permit, without sacrificing picking efficiency. It is a further object to provide such drive apparatus and method which permit flexibility in optimizing harvesting speeds to suit crop conditions.

It is still another object of the present invention to provide an improved cotton harvester spindle drive apparatus and method which prevent spindle and doffer drive wear and inefficiency resulting from overspeed operation. It is still another object to provide such a drive apparatus and method which allow optimization of spindle and drive speeds without significantly increasing power requirements or reducing wear life of the spindle drive train components.

It is another object of the invention to provide an improved cotton picker spindle drive arrangement and method of operating the drive which permit harvester operation at ground speeds greater than conventional ground speeds under favorable picking condition without sacrificing picking efficiency. It is a further object to provide such a drive arrangement and method wherein optimum spindle rotational speeds can still be maintained in adverse picking conditions when the harvester is operating at ground speeds below maximum. It is yet another object to provide such a drive which maximizes doffing efficiency for different ground speeds.

In accordance with the above objects, one embodiment of the invention includes a speed changing device, in the form of either an automatic or a manual transmission, located between the drum and spindle drives of a cotton picker row unit. The device provides a variable ratio spindle-to-drum speed so that ground and spindle speed can be optimized to match field conditions. An automatic transmission with one or more shift points provides a plurality of gear ratio combinations to optimize spindle speed while maintaining ideal harvester ground speed for the prevailing crop conditions. Shift point selection provides downshifting when the spindle rotational speed approaches or reaches the desired maximum of slightly over approximately 4000 RPM and upshifting when the speed drops below about 4000 RPM to maintain spindle speed within a range around the optimum as ground speed (and therefore drum speed) is changed.

Alternatively, a manually operated transmission, such as a shiftable idler located between the drum and spindle drives on each row unit, provides a simple, inexpensive and compact structure that the operator can easily position to select the best ratio for optimum spindle speed and harvester speed for the given field conditions. An overspeed circuit senses rotational speed of one of the spindle drive components and shuts down drive to the row unit when the spindle speed exceeds a preselected maximum speed.

In another embodiment of the invention, variable ratio between the drum and spindle drives is provided by introducing an independent spindle drive train. The drum speed is synchronized to the forward speed of the harvester in the conventional manner. The optimum spindle rotational speed, usually in a narrow RPM range close to about 4000 RPM, is maintained by a second drive operating independently of the drum speed. A constant speed hydrostatic drive may be utilized to maintain a selected spindle speed regardless of ground speed.

A further embodiment of the invention utilizes a constant speed unit drive to maintain spindle speed within the optimum range. A 2-speed auxiliary gear case coupled to a multispeed transmission provides picking ground speeds in the range of 3.5, 4.2 and 5.0 MPH, and drum synchronization is provided by a gear change in the drum drive gears.

These and other objects, features and advantages of the present invention will become apparent to one skilled in the art upon reading the following detailed description in view of the drawings.

DETAILED DESCRIPTION OF THE DRAWINGS

The Prior Art

Figure 1:
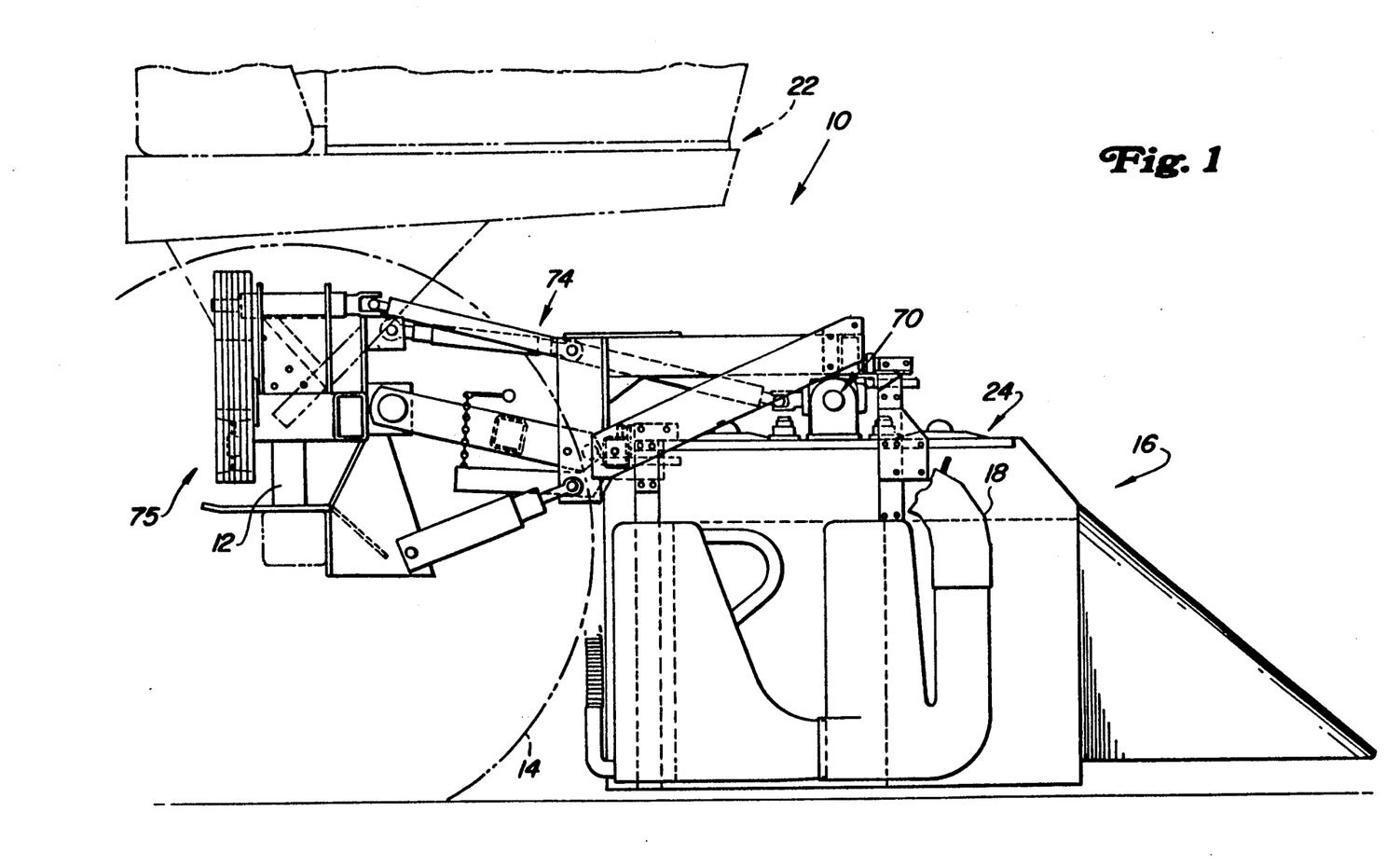
FIG. 1 is a side view of the forward portion of a cotton picker including the row unit.

Referring to FIG. 1, there is shown a cotton harvester 10 having a main frame 12 supported for forward movement over the ground by wheels 14. Cotton harvesting row unit structure 16 is supported from the forward end of the main frame for removing cotton from rows of cotton plants, and air duct structure 18 is provided for directing the harvested cotton upwardly and rearwardly to basket structure (not shown) supported on the main frame 12 behind a cab 22.

The row unit structure 16, with the exception of the drive arrangement, is of standard construction (FIG. 2) and includes a housing 24 having a top plate 26 and a center sheet 28. Drive structure 30, including a picker drum drive 30a and a picker spindle drive 30b are supported between the top plate 26 and center sheet 28. A vertical sleeve 34 passes through the center sheet 28 and carries a spindle drive gear 36 which meshes with spindle shaft gears 38 for spindle columns 40 of picker drum 42.

Figure 2:
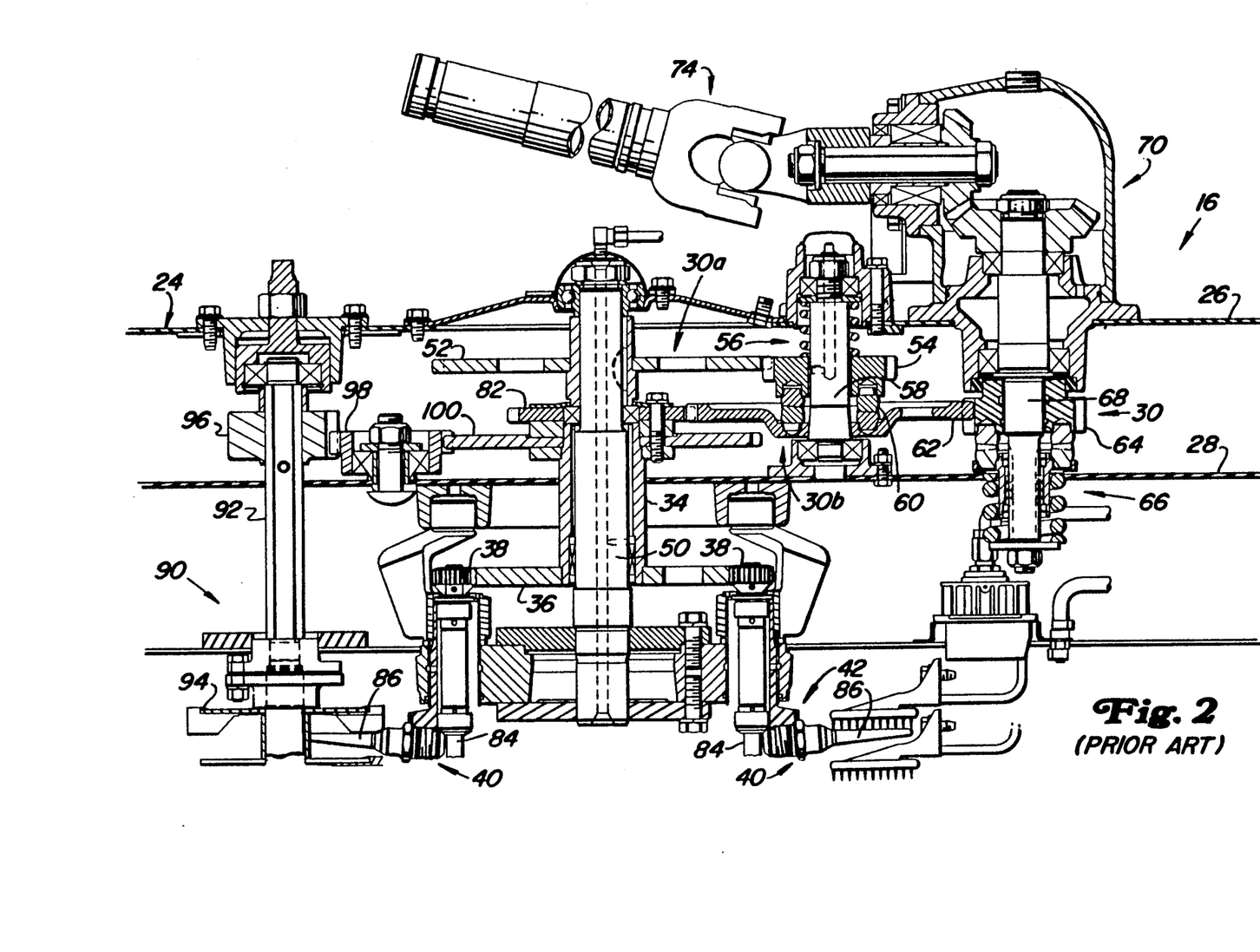
FIG. 2 is a sectional view of a conventional row unit transmission wherein the ratio of drum speed and spindle speed is fixed.

A vertical picker drum shaft 50 extends upwardly from the drum 42 through the sleeve 34 and is keyed to a drum gear 52 which constantly meshes with a driven portion 54 of a slip clutch 56 supported by a vertical shaft 58. A drive portion 60 is constrained to rotate with a gear 62 about the axis of the shaft 58. The gear 62 meshes with a driving pinion 64 of a slip clutch assembly 66 at the lower end of a vertical shaft 68 which is driven from a gearbox 70 located on the top of the housing 24. The gearbox is driven by a conventional shaft drive assembly 74 operably connected to the harvester ground drive 75.

The gear 62 meshes with a gear 82 fixed to the sleeve 34 to drive the gear 36. The gear 36 rotates with the sleeve 34 on the drum shaft 50 to rotate spindle drive shafts 84, which, in turn, drive individual spindles 86 in each of the columns 40 in a conventional manner.

An upright doffer column 90 is supported for rotation in the housing 24 by a doffer shaft 92 and includes a plurality of doffer pads 94 offset above the paths of the rows of spindles 86. A drive gear 96 meshes with an idler gear 98 which, in turn, meshes with large gear 100 fixed for rotation with the sleeve 34. The doffers 94 are therefore rotated at a speed which is proportional to the speed of the spindles 86, which are also driven from the sleeve 34. As is evident from FIG. 2, the drive structure 30 fixes the ratio of the rotational speed of the picker drum 42 to the rotational speed of the spindles 86 (and to the doffers 94). Optimum spindle speed range, which is plus or minus 200 RPM from approximately 4000 RPM (plus or minus about 5%) therefore dictates that ground speed be maintained within the same range. Increase in ground speed above optimum speed will result in spindle overspeed which causes excess wear and inefficient picking and excessively tight wrapping of the cotton on the spindle. Decrease in ground speed slows spindle and doffer speeds below the minimums necessary for good picking efficiency and proper doffing action.

The Improved Drive Structure

Referring to FIGS. 3–6, improved drive structures 110a (FIG. 3), 110b (FIG. 4), 110c (FIG. 5) and 111 (FIG. 6) are shown for providing variable ratio drum-to-spindle drive. The embodiments of FIGS. 3–5 utilize transmissions housed within the row unit 16 structure to change the ratio of drum speed to spindle speed. The embodiment of FIG. 6 accomplishes optimum spindle speed independently of drum speed by providing a separate spindle drive train.

Figure 3:
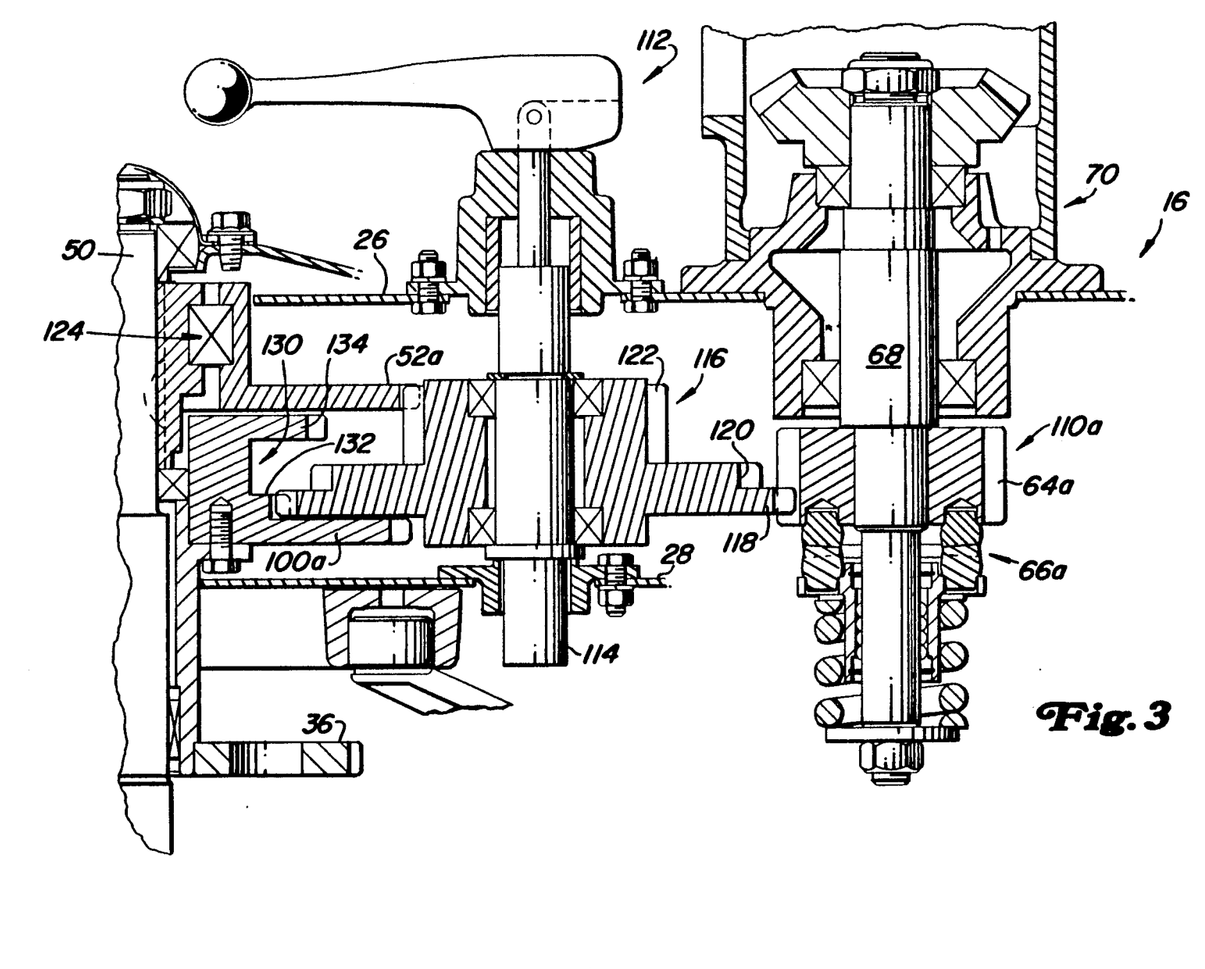
FIG. 3 is a sectional view of a portion of an improved row unit transmission which includes a manually shiftable idler located between the drum and spindle drives.

The embodiment of FIG. 3 provides manual shifting of the drum-to-spindle ratio with hand lever assembly 112 connected to a vertically positionable idler shaft 114 which rotatably supports a combination 3-gear idler 116. The idler 116 has a lowermost, large diameter gear portion 118 in constant mesh with the drive pinion 64a of the input slip clutch 66a. A central, smaller diameter gear portion 120 is located above the portion 118 and below a small diameter drum drive gear portion 122 which is in constant mesh with the main drum gear 52a. The drum gear 52a is connected through a roller- or jaw-type slip clutch 124 to the drum shaft 50. A spindle and doffer drive gear assembly 130 is mounted for rotation relative to the drum shaft 50 and is fixed for rotation with the spindle drive gear 36. The assembly 130 includes a lowermost doffer drive gear 100a, a first small diameter high speed spindle drive gear portion 132, and a larger low speed spindle drive gear portion 134 offset above the portion 132.

Figure 8:
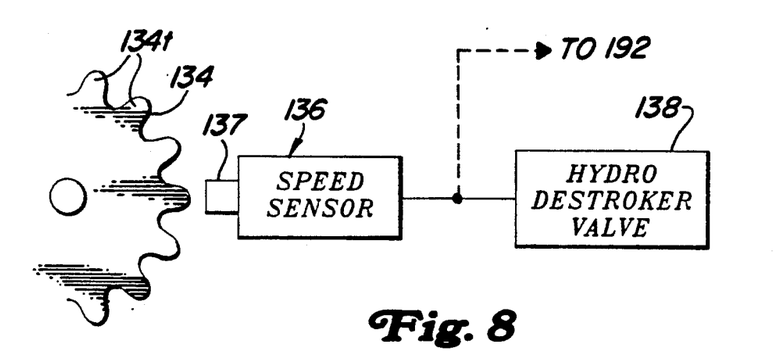
FIG. 8 is a schematic representation of a control system for automatically disconnecting drive when the spindle speed exceeds a preselected maximum speed.

An overspeed protection circuit (FIG. 8) includes a speed sensor circuit 136 with a magnetic pickup 137 which senses the movement of gear teeth to provide a pulse train having a frequency dependent on the spindle rotational speed. As shown, the pickup 137 is located in close proximity to the gear teeth (134t) on the gear 134 (or to any gear downstream of the gear 134 in the spindle and doffer drives). The output of the speed sensor circuit 136 is connected to the hydro destroker valve 138 on the main hydraulic drive of the harvester. When the frequency of the pulse train increases beyond a preselected frequency corresponding to the upper limit rotational speed of the spindles, a signal is provided to the valve to shut down drive to row unit and the harvester and thus avoid damage to the spindles and spindle and doffer drives. The operator can raise the lever assembly 112 to provide a lower spindle-to-drum speed ratio to avoid spindle overspeed at higher ground speeds.

With the lever assembly 112 (FIG. 3) in the position shown, the large gear portion 118 of the idler 116 meshes with the small gear portion 132, and relatively high spindle and doffer drive speed is provided for slower ground speed (and therefore slower drum speed) operation, for example when operating in high yield cotton where ground speed is 3.5 MPH or less. Raising the lever assembly 112 moves the large gear portion 118 of the idler 116 out of mesh with the portion 132, and moves the portion 120 into mesh with the upper gear portion 134 for a slower spindle and doffer speed relative to the drum speed. The upper position is selected when harvest conditions permit a high ground speed, for example, about 4.2 MPH (and a corresponding higher drum speed) to avoid operating the spindles 86 and the doffer column 90 at a rotational speed above the maximum desired speed. In either position of the lever assembly 112, direct drive is provided from the input of the slip clutch 66a to the drum gear 52a via the gear portions 118 and 122 such that the drive ratio between the input shaft 68 and the drum 42 remains constant to maintain zero relative forward velocity between the cotton plant and the spindles while the spindles are in picking relationship with the cotton plants.

Figure 4:
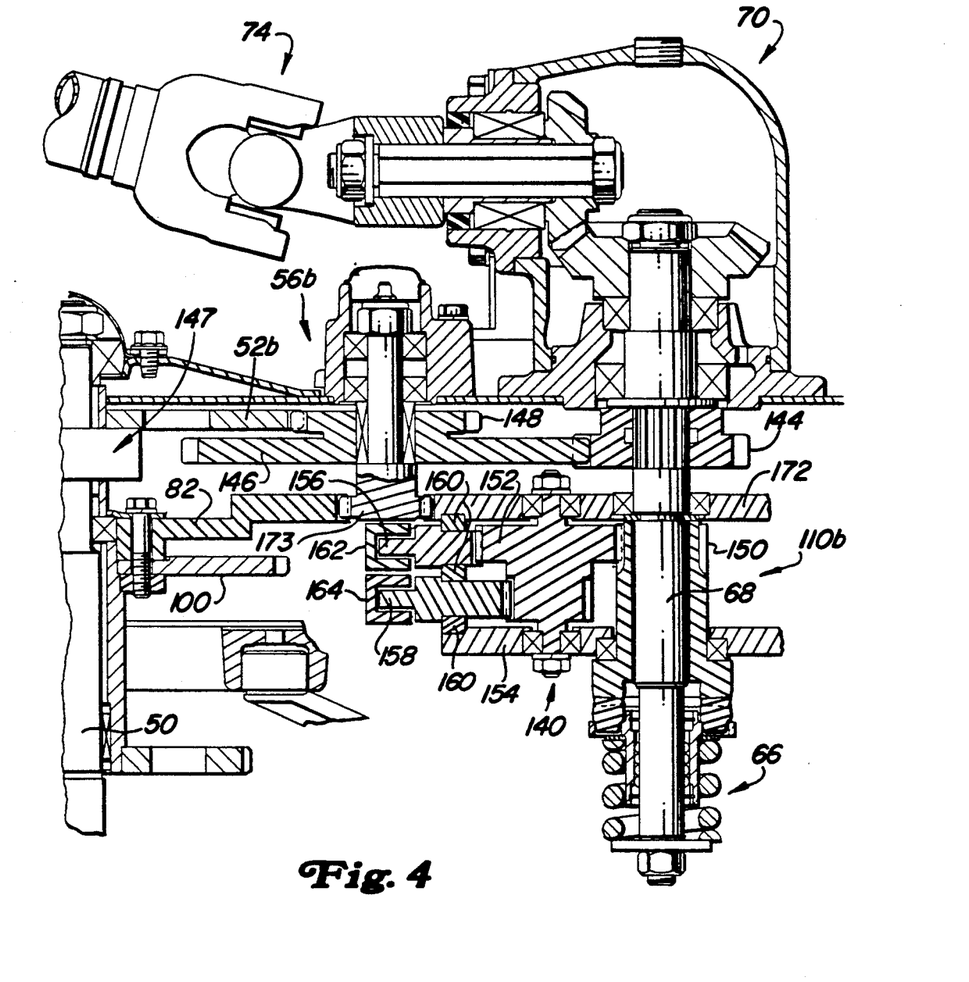
FIG. 4 is a sectional view of a portion of an improved row unit transmission and showing an alternate embodiment of the invention wherein a compound planetary gear reduction unit provides variable ratio.
Figure 5:
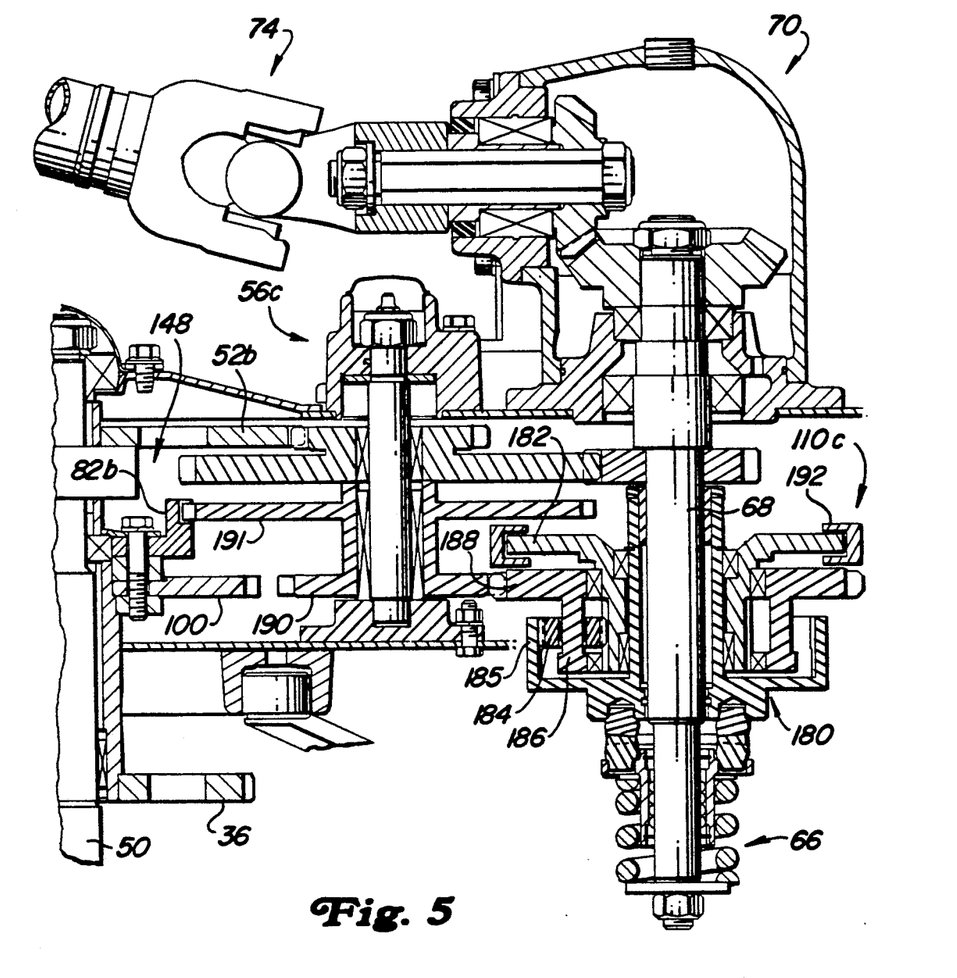
FIG. 5 is view similar to FIG. 4 but showing an alternate planetary gear reduction unit for providing variable ratio.

In the embodiments shown in FIGS. 4 and 5, the drive structures 110b and 110c include planetary transmissions within the housing structure and centered on the input drive shaft 68 above the slip clutch 66. Constant ratio drive is provided between the drive shaft 68 and the drum 42, while the ratio between the drive shaft 68 and the spindles 86 is changed to optimize spindle speed.

Referring now specifically to FIG. 4, the drive structure 110b includes a compound planetary gear reduction unit 140 connected between the final drum and spindle drives. The drum drive includes a drive gear 144 fixed to the shaft 68 and meshing with a lower gear 146 of idler 56b. The main drum gear 52b, which is connected through a slip clutch 147 to the drum shaft 50, meshes with an upper gear 148 of the idler to provide direct drive from the input shaft 68 to the drum 42.

The slip clutch 66 (FIG. 4) is located at the lower end of the shaft 68 and drives sun gear 150 which is supported on the shaft 68 for rotation about the shaft axis. Compound planetary pinions 152 mounted on a planet pinion carrier 154 mesh with the sun gear 152 and with first and second ring gears 156 and 158 mounted in the carrier between loose wear discs 160. A disk brake system has slow ground speed and high ground speed ring gear brakes 162 and 164, respectively, which are alternatively activatable on the go for high speed and low speed carrier rotation relative to the input shaft 68.

An output gear 172 fixed for rotation with the carrier 154 meshes with the spindle and doffer drive gear 82 through an idler 173 supported above the gear 100. The gear 172 drives the spindles and doffers at rotational speeds dependent on the state of the transmission 140. For harvester ground speeds below a preselected speed, the brake 162 is energized to increase the speed of the carrier 154 and thus the output gear 172 relative to the speed of the shaft 68 to maintain spindle rotational speed above a preselected minimum speed. When harvester ground speed is increased to a point where the rotational speed of the spindles is increased beyond a preselected desired maximum speed, the brake 162 is released from the ring gear 156, and at the same time the brake 164 is engaged on the ring gear 158 to reduce the speed of the carrier 154 to maintain the spindle speed within an optimum range generally centered on a speed of around 4000 RPM. Preferably, shifting is automatic and controlled by a shaft speed sensor (FIG. 7) operably connected to the disk brake system. For example, at ground speeds below about 3.5 MPH (5.8 kmh), the high speed output will be selected buy activating the brake 162. Above that speed, the transmission will shift to low speed operation (brake 164 will be activated) to prevent spindle and doffer overspeed. The shift points of the transmission are selected to provide optimum spindle and doffer speeds for the typical forward speeds at which the harvester is most likely to be operated (for example, a conventional speed of 3.5 MPH and a higher speed of 4.2 MPH, made possible in part by the variable ratio drum-to-spindle speed structure described herein).

Figure 7:
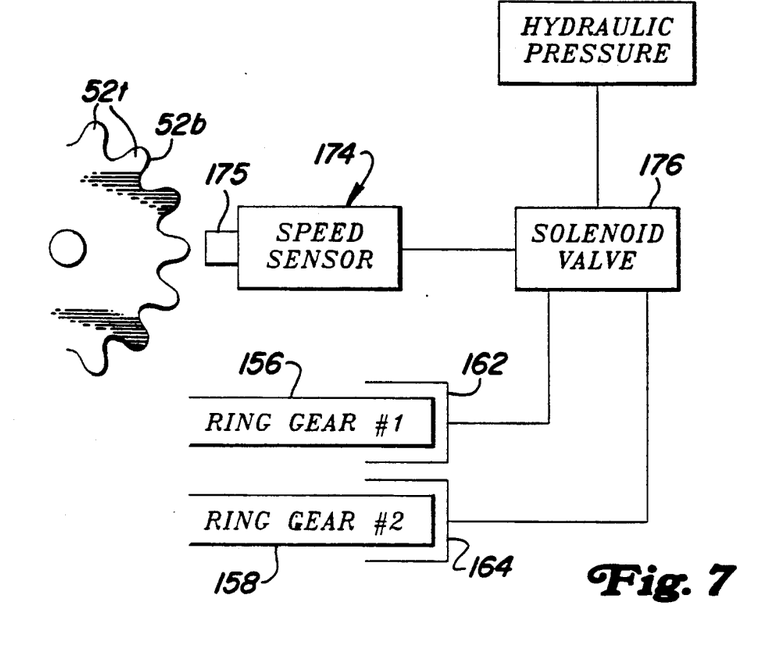
FIG. 7 is a schematic representation of a control system for automatically changing spindle-to-drum ratio on the go to prevent spindle overspeed or underspeed operation.

As shown in FIG. 7, the circuit for automatically shifting the transmission 140 includes a speed sensor circuit 174 having a magnetic pickup 175 which senses movement of gear teeth (52t) of a gear (52b) having a speed of rotation proportional to the forward speed (and thus the drum speed) of the harvester. A solenoid valve 176 is connected between the source of hydraulic fluid on the harvester and the brakes 162 and 164. The valve 176 is controlled by the output of speed sensor circuit 174. Pulses generated by the pickup 175 are processed by the circuit 174. When the frequency of the pulse train is above a preselected level (relatively high ground speed), a first signal is provided to the valve 176 to activate the brake 164 and release the brake 162 to reduce spindle speed relative to drum speed. A second signal is provided at output of the circuit 174 when the frequency of the pulse train remains below a preselected level (relatively slow ground speed operation) to activate the brake 162 and release the brake 164 to increase spindle speed relative to drum speed.

In the embodiment of FIG. 5, which is similar to but more compact than the FIG. 4 embodiment, the drive structure 110c includes a planetary gear reduction transmission 180 having a selectively lockable sun gear 182 meshing with planet pinions 184 supported by a planet pinion carrier 186. The planet pinions 184 mesh with ring gear 185 which is connected to the output of the slip clutch 66 for rotation about the axis of the shaft 68. A spindle drive gear 188 connected to the carrier 186 meshes with a lower idler gear 190 supported on idler structure 56c. An upper idler gear 191 meshes with the gear 82b which in turn is fixed for rotation with the spindle drive gear 36 and doffer gear 100 about the shaft 50. At high ground speeds, a brake 192 is selectively activatable to lock up the sun gear 182 and shift the transmission to low for reduced spindle and doffer speeds relative to drum speed. For lower ground speeds, the brake 192 is released to release the sun gear 182, and the sun gear 182 is locked to the drive gear 188 to return the transmission to high for higher spindle and doffer speeds relative to drum speeds. A speed sensor circuit of the type shown at 136 in FIG. 8 having an output connected to the brake 192 (broken lines) can be used to activate the brake 192 to reduce spindle speed at high ground speeds.

Figure 6:
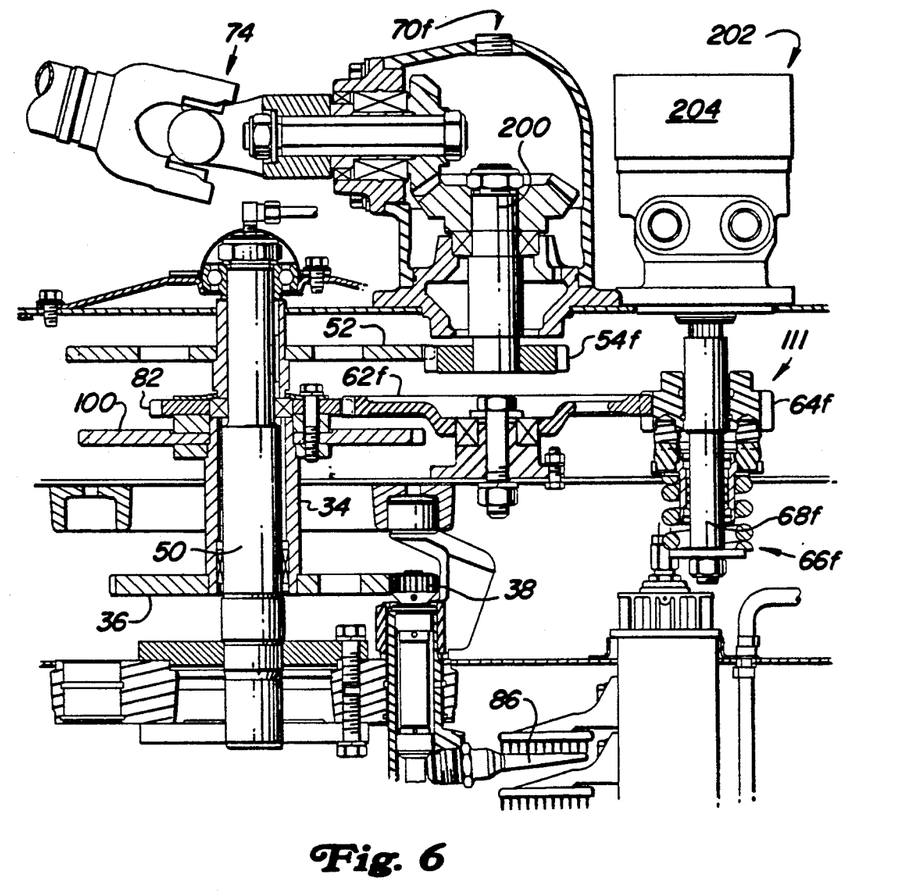
FIG. 6 is a sectional view of an alternate embodiment of the invention wherein an independent spindle drive is provided.

FIG. 6 shows an alternate embodiment of the invention wherein the spindle drive 111 and the drum drive are independent. As shown in FIG. 6, the gearbox 70f connected to the drive assembly 74 is offset rearwardly from its normal position in line with the shaft 68. Driven shaft 200 projects downwardly into the row unit, generally in the position the idler shaft for the slip clutch 56 (FIG. 2) of a conventional unit is located, and drives a gear 54f which meshes with the drum gear 52. An independent spindle drive, indicated generally at 202 in FIG. 6, rotates the spindles 86 at speeds within the desired range of speeds (preferably around 4000 RPM) regardless of the forward speed of the harvester.

As shown in FIG. 6, the drive 202 includes a constant speed motor 204, preferably a hydraulic motor, is coupled to the input drive shaft 68f and connected to the source of hydraulic pressure on the harvester. The large idler gear 62f located below the level of the gearbox 70f meshes with a driving pinion 64f of the slip clutch assembly 66f and with the gear 82 to drive the sleeve 34 and thus the doffer gear 100 and spindle gear 36. A slip clutch (not shown) may be included between the drive assembly 74 and the drum shaft 50. On a multi-unit harvester, a single constant speed motor 204 may be mechanically connected to the spindle drives through a conventional drive shaft and gearbox arrangement, or each unit may have an individual motor 204 connected by hoses to the source of hydraulic pressure.

In an alternate embodiment of the invention (FIG. 9), unit drive from the gear case to the row unit spindle drive and drum drive remains at a generally constant speed regardless of the gear ratio selected of the transmission. Synchronization of the drum speed with the ground speed is achieved by shifting the gears on the drum drive in the row unit.

Figure 9:
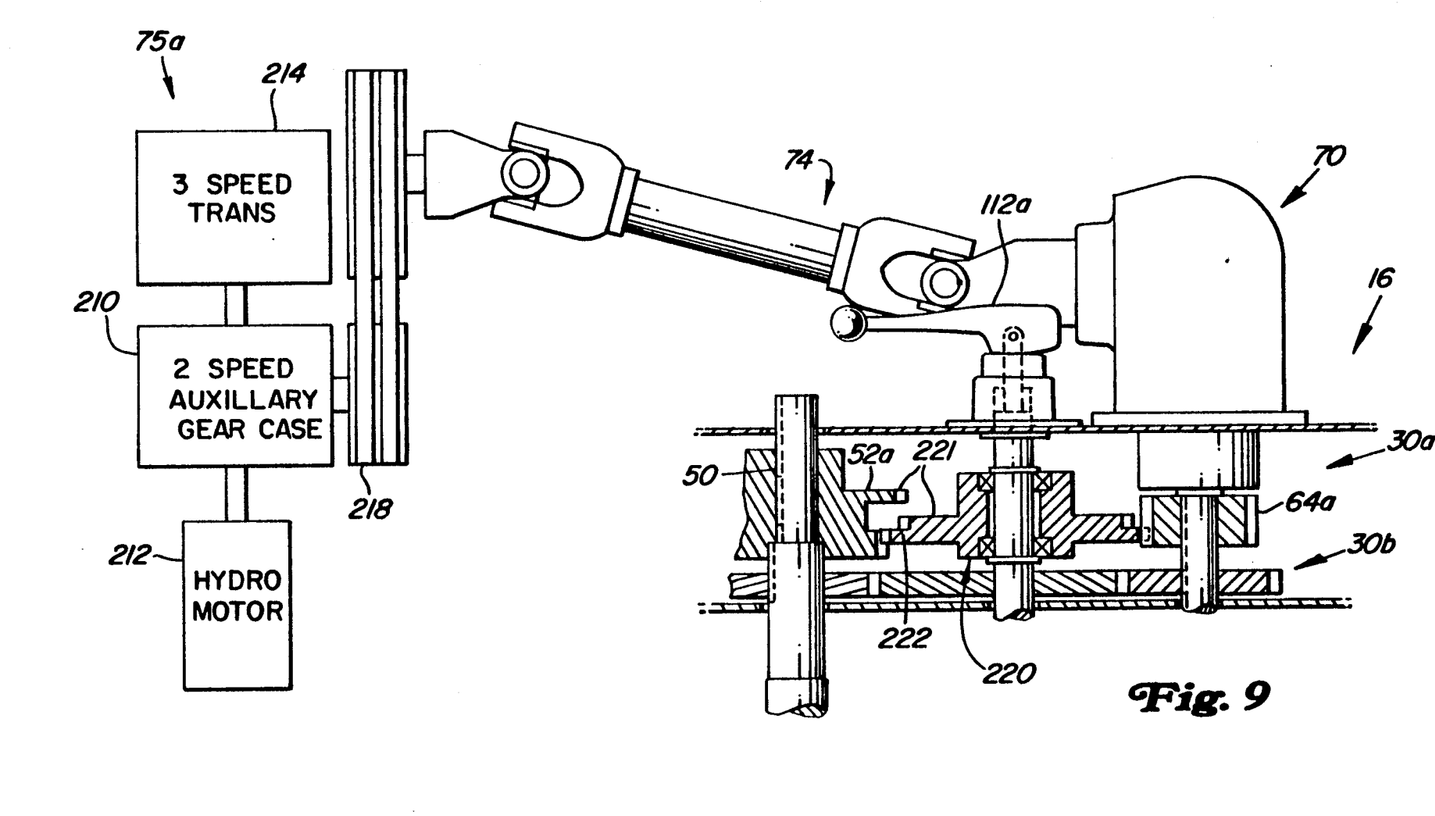
FIG. 9 is a schematic representation of an alternate embodiment of the invention in which variable spindle to drum speed is accomplished with a changeable gear arrangement in the drum drive.

As shown in FIG. 9, a two-speed auxiliary gear case 210 is connected between the hydro motor 212 and a three-speed transmission 214. A unit drive sheave 218 is connected to the gear case 210 and drives the inputs to both the spindle and drum drives 30a and 30b at a constant speed dependant on the hydro motor speed but independent of the selected gear case and three-speed transmission ratios. The drum drive includes a gear shift arrangement 220 with a set of low speed gears 221 for operating the drum at a relatively slow speed to synchronize the drum speed with the ground speed for slow speed operation (preferably about 3.5 MPH). The drum drive also includes high speed gears 222 for operating the drum at a higher speed for synchronization at the higher ground speed (preferably about 4.2 MPH). A slip clutch (not shown) may be provided between the gear set 52a and the shaft 50.

An arrangement similar to that shown in FIG. 3 for spindle speed change can be provided for shifting between high speed and low speed drum operation. A lever assembly 112a (FIG. 9) similar to lever assembly 112 selectively moves one set of the gears 221 and 222 into mesh. For low drum speed, the lever 112a is moved up to bring the gears 221 into meshing relationship. For high drum speed operation, the lever is moved down so the gears 222 engage.

Non-synchronized slow speed drum drive for the higher operating speed (4.2 MPH) is also available, as is non-synchronized operation at very high speed (5 MPH) for second pass picking. The available drum drive gear combinations provide necessary synchronization of drum and ground speeds in the normal picking speed ranges, and high speed non-synchronized operation for second pass picking without the disadvantage of possible spindle drive overspeed. A chart of the transmission and gear case ratios with the available drum drive gear combinations is set forth below. The first column lists the possible ratios of the three-speed transmission 214 and the second and third columns correspond to the low and high speed ratio of the gear case 210.

| Gear ratio 214: | Aux. Gear Case 210: LOW | Aux. Gear Case 210: HIGH |
| --- | --- | --- |
| 3rd | 11.2 MPH-Slow speed transport only | 13.4 MPH-High Speed transport only |
| 2nd | 4.2 MPH Slow speed drum drive 221 (non-synchronized) High speed drum drive 222 (synchronized) | 5.0 MPH High speed drum drive 222 (non-synchronized) only |
| 1st | 3.5 MPH Slow speed drum drive 221 (synchronized) only | 4.2 MPH Slow speed drum drive 221 (non-synchronized) High speed drum drive 222 (synchronized) |

Alternately, the drum drive gear speed change can be provided by a changeable gear set or by an automatic transmission in the drum drive 30a. For example, the gears 52 and 56 appearing in FIG. 2, can be replaced with different diameter gears to change drum speed relative to spindle speed for synchronization at the different gear case and transmission ratio combinations.

Having described the preferred embodiment, it will become apparent that various modifications can be made without departing from the scope of the invention as defined in the accompanying claims.

We claim:

1. A method of operating a cotton harvesting row unit in a field of cotton plants, the row unit having a rotatable picker drum with rotating spindles and picker drum and spindle drives, wherein the rotational speed of the spindles is proportional to the rotational speed of the picker drum, the spindles having an optimum rotational speed for maximum picking efficiency, the method including:
   driving the picker drum at a speed proportional to the forward speed of the row unit;
   providing transmission means for changing the ratio of the speed of the spindles relative to the speed of the picker drum to maintain spindle speed at approximately the optimum speed regardless of the forward speed of the row unit.

2. The method as set forth in claim 1 wherein the step of providing transmission means includes providing a transmission between the drum drive and the spindle drive, and further including shifting the transmission to increase the spindle speed relative to the drum speed as the forward speed of the row unit is reduced, and to decrease the spindle speed relative to the drum speed as the forward speed is increased.

3. The method as set forth in claim 2 wherein the step of providing a transmission includes providing an automatic transmission, and the step of shifting the transmission includes automatically shifting the transmission at preselected forward speeds.

4. The method as set forth in claim 1 wherein the step of providing transmission means includes providing a shiftable ratio-changing idler assembly between the drum drive and the spindle drive.

5. The method as set forth in claim 4 wherein the step of providing an idler assembly includes providing a set of gears having at least two positions, and changing positions of the gears depending upon the forward speed of the row unit.

6. In a cotton harvester having a engine-driven ground drive for moving the harvester forwardly through a field of cotton plants, a picker row unit having an upright housing, an upright picker drum supported in the housing and including upright columns of spindles rotatable about spindle axes, a variable ratio drum-to-spindle drive comprising:

a drum drive drivingly connected to the ground drive for rotating the picker drum at a speed proportional to the forward speed of the harvester;

a spindle drive for rotating the spindles about the spindle axes; and transmission structure operably connecting the drum and spindle drives and changeable to increase the ratio of the spindle speed to drum speed for row unit forward speeds below a preselected speed and to decrease the ratio of spindle speed to drum speed for row unit forward speeds above a preselected speed.

7. The invention as set forth in claim 6 wherein the transmission structure comprises an idler gear connected between the drum drive and the spindle drive and shiftable within the housing.

8. The invention as set forth in claim 6 wherein the drum drive includes a drum gear fixed for rotation with the picker drum, and a main driven gear rotatable within the housing about an upright axis, the transmission structure including a shiftable idler gear in constant driving relationship with the main driven gear and the drum gear, and means for moving the shiftable gear.

9. The invention as set forth in claim 8 wherein the means for moving the shiftable gear includes a lever located near the top of the row unit housing.

10. The invention as set forth in claim 6 wherein the transmission structure comprises a planetary transmission located between the drum drive and the spindle drive.

11. The invention as set forth in claim 10 including an input drive shaft having a gear connected thereto and drivingly connected to the drum, and wherein the planetary transmission is centered on the input drive shaft and drivingly connected to the spindle drive.

12. The invention as set forth in claim 11 further including a slip clutch located on the input drive shaft.

13. The invention as set forth in claim 12 further comprising a second slip clutch connected between the fixed gear and the picker drum.

14. A method of operating a cotton harvesting row unit in a field of cotton plants, the row unit having a rotatable picker drum with rotating spindles, the spindles having a narrow range of optimum rotational speeds for maximum picking efficiency, the method including:

providing a picker drum drive;

selecting a forward operating speed for harvesting cotton;

driving the picker drum at a speed proportional to the forward speed of the row unit;

providing a spindle drive having a range of optimum spindle rotational speeds; and rotating the spindles at a speed within the range of optimum speeds independently of the selected operating speed.

15. The method as set forth in claim 14 wherein the step of rotating the spindles includes driving the spindles with a constant velocity motor at a constant ratio relative to the motor.

16. The method as set forth in claim 15 including:

providing a drum drive transmission, and the step of selecting a forward harvesting speed includes shifting a multispeed drive transmission, and the step of driving the picker drum at a speed proportional to the forward speed includes shifting the drum drive transmission dependent on the selected forward harvesting speed to synchronize forward speed with drum speed.

17. The method as set forth in claim 14 wherein the step of providing a spindle drive includes supporting, from the row unit, a first upright shaft operably connected to the spindles adjacent a second upright shaft operably connected to the drum, and connecting the first and second upright shafts to independently operated drive mechanisms.

18. In a cotton harvester having an engine-driven ground drive for moving the harvester forwardly through a field of cotton plants, a picker row unit having an upright housing, an upright picker drum supported in the housing and including upright columns of spindles rotatable about spindle axes, the drum rotatable about an upright axis for moving the spindles into picking relationship with the cotton plants, a variable ratio drive comprising:

a drum drive drivingly connected to the ground drive for rotating the picker drum at a speed proportional to the forward speed of the harvester while the spindles are in picking relationship with the cotton plants; and a spindle drive including transmission means connected between the engine and the spindle columns for rotating the spindles about the spindle axes at a speed within a generally constant optimum range of speeds regardless of the forward speed.

19. In a cotton harvester having an engine-driven ground drive for moving the harvester forwardly through a field of cotton plants, a picker row unit having an upright housing, an upright picker drum supported in the housing and including upright columns of spindles rotatable about spindle axes, the drum rotatable about an upright axis for moving the spindles into picking relationship with the cotton plants, a variable ratio drive comprising:

a drum drive operably connected to the engine-driven ground drive for rotating the picker drum at a speed dependent on the forward speed of the harvester; and an engine-driven spindle drive for rotating the spindles about the spindle axes at a speed within a generally constant optimum range of speeds regardless of the forward speed, the spindle drive including a constant velocity drive operable independently of the drum drive.

20. The invention as set forth in claim 18 including an idler connecting the drum drive and the spindle drive, the idler having a plurality of selectable drive gears, and means for the selecting the idler drive gear dependent on the forward speed of the harvester.

21. The invention as set forth in claim 20 wherein the means for selecting the drive ratio includes a vertically movable shaft connected to the idler and extending upwardly through the housing.

22. The invention as set forth in claim 21 wherein the idler includes a gear in continuous and constant drive ratio relationship between the drum drive and spindle drive.

23. The invention as set forth in claim 18 including a planetary transmission connected between the drum drive and the spindle drive.

24. The invention as set forth in claim 23 wherein the drum drive includes a main input shaft operably connected to the ground drive and to the picker drum through a plurality of drum gears, and wherein the planetary transmission includes: a sun gear centered on the main input shaft, a planet pinion carrier, and an output gear connected to the carrier and to the spindle drive below the plurality of drum gears.

25. The invention as set forth in claim 24 including means for shifting the planetary transmission at a preselected shift point including a speed sensor providing an output signal dependent upon picker drum rotational speed and shift structure responsive to the sensor output signal.

26. The invention as set forth in claim 21 including a speed sensor for providing an output signal dependent upon spindle rotational speed, and means responsive to the output signal for removing drive from the spindles when spindle speed exceeds a preselected maximum speed.

27. The invention as set forth in claim 18 wherein the drum drive includes shiftable gears for changing the ratio of the drum drive speed to the spindle speed.

28. The invention as set forth in claim 27 wherein the ground drive includes transmission structure with at least first, second and third selectable harvesting speed gear rations, and the drum drive includes a low speed gear structure for harvesting at a first low speed corresponding to the first transmission ratio and a high speed gear structure for harvesting at a second higher speed corresponding to the second transmission ratio, wherein the drum speed is synchronized with the forward speed of the harvester at the first and second harvesting speeds.

29. The invention as set forth in claim 28 wherein the harvester transmission structure includes a two-speed auxiliary gear case connected between a multi-ratio output transmission and a hydro motor, and further including a single speed row unit drive connected between the auxiliary gear case and the drum and spindle drives for driving the spindle drive at a speed dependant upon the speed of the hydro motor but independent of the selected harvesting speed gear ratio.

* * * * *